Dec. 24, 1963   J. L. SCHANZ   3,115,450
NUCLEAR REACTOR CONTAINMENT APPARATUS
Filed Feb. 24, 1959   2 Sheets-Sheet 1
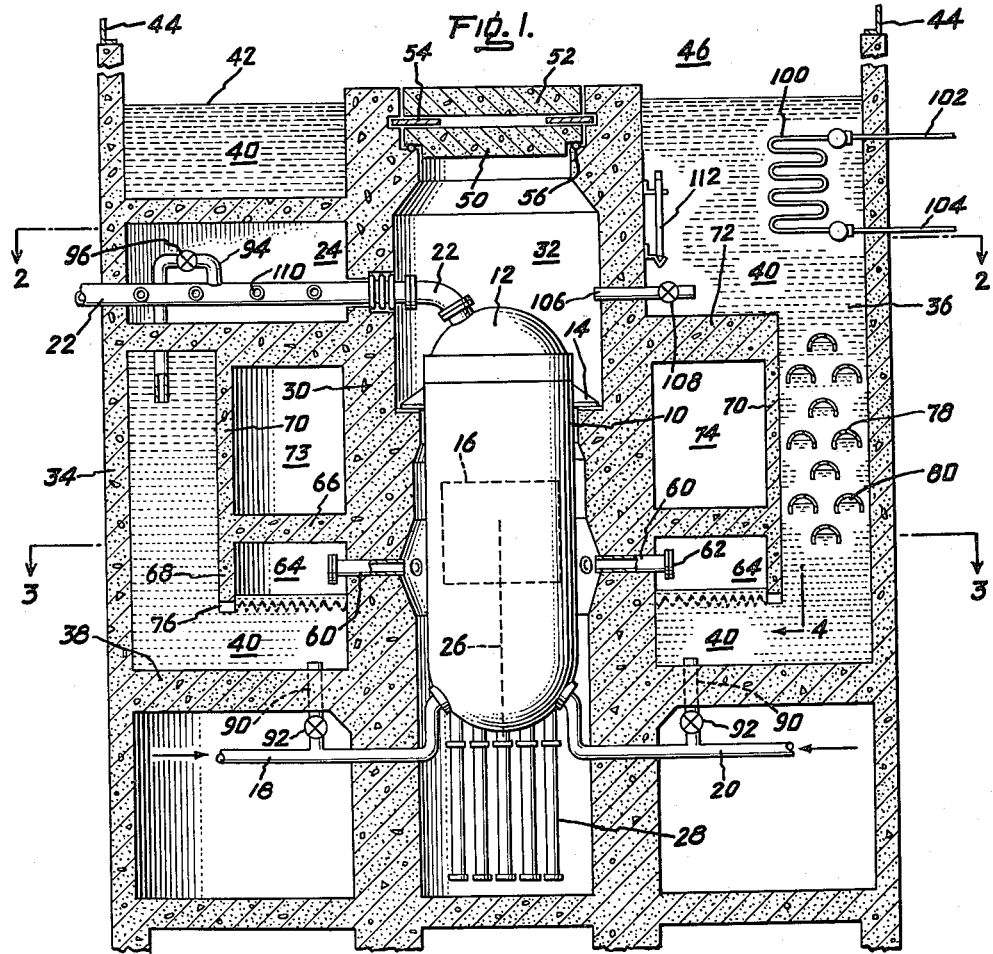
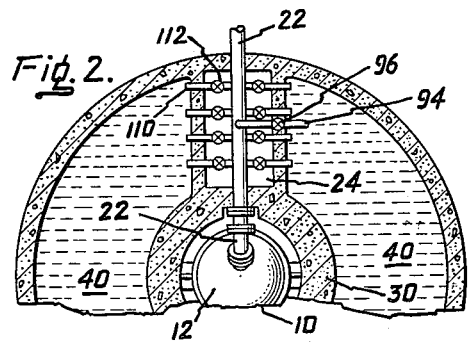
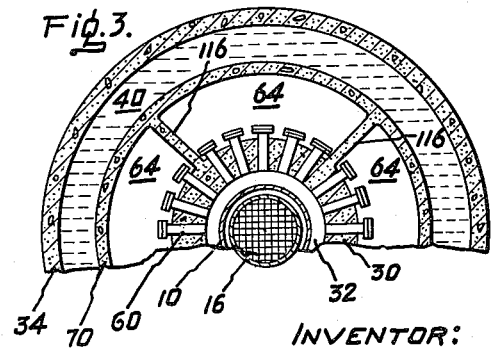
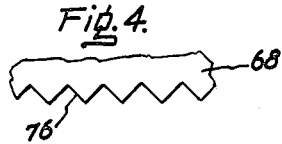
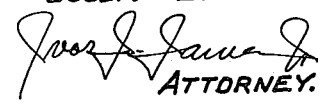
INVENTOR:
JOSEPH L. SCHANZ,
BY
ATTORNEY.

Dec. 24, 1963   J. L. SCHANZ   3,115,450
NUCLEAR REACTOR CONTAINMENT APPARATUS
Filed Feb. 24, 1959   2 Sheets-Sheet 2
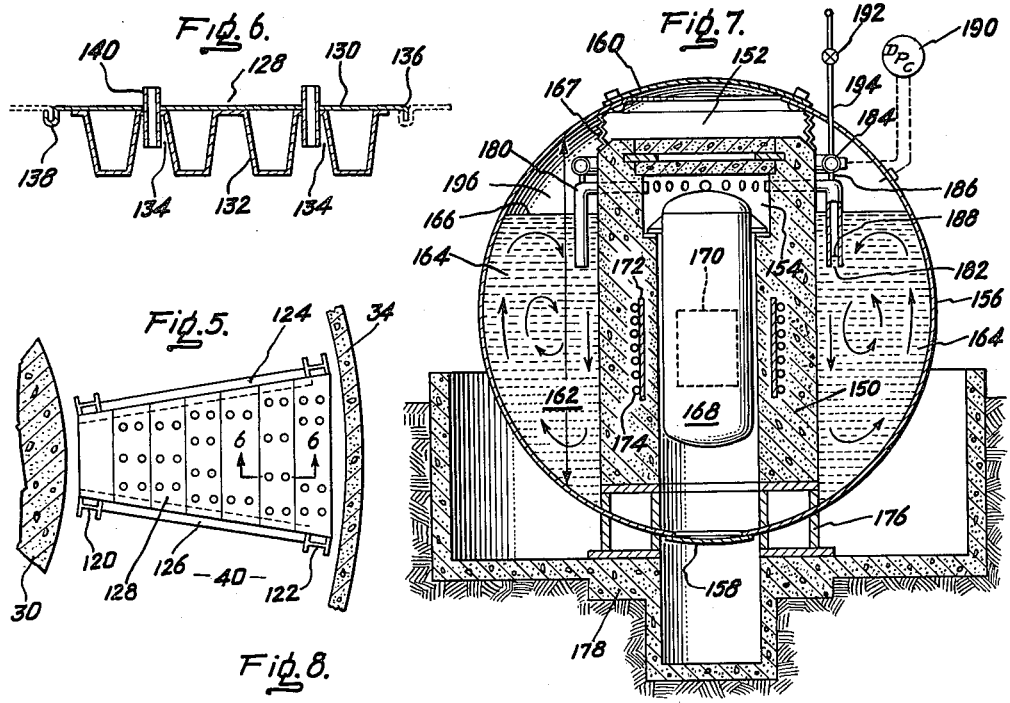
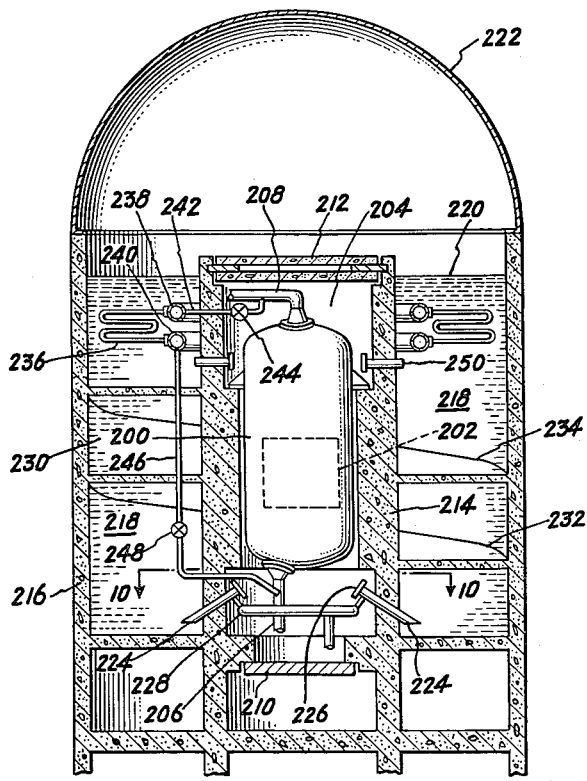
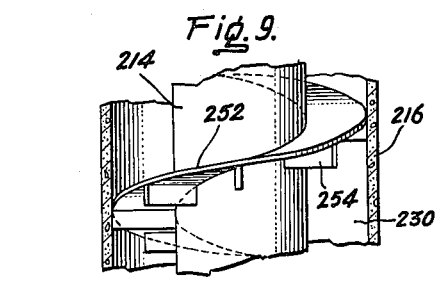
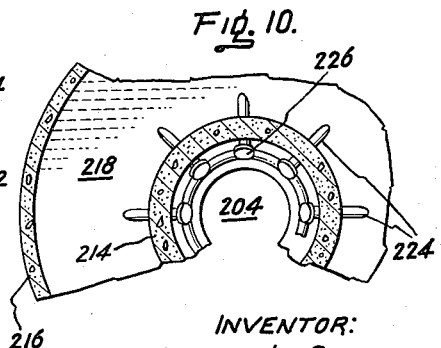
INVENTOR:
JOSEPH L. SCHANZ,
BY
ATTORNEY.

United States Patent Office 3,115,450
Patented Dec. 24, 1963

3,115,450
NUCLEAR REACTOR CONTAINMENT
APPARATUS
Joseph L. Schanz, San Jose, Calif., assignor to General Electric Company, a corporation of New York
Filed Feb. 24, 1959, Ser. No. 794,895
19 Claims. (Cl. 204—193.2)

This invention relates to the conversion of mass to energy in nuclear reactors, and it more particularly relates to an improved combined reactor support, radiation shield, and containment apparatus of substantially increased efficiency and reduced size.

The release of large amounts of energy through nuclear fission reactions is now quite well known. In general, a fissionable atom, such as $U^{233}$, $U^{235}$, $Pu^{239}$, or $Pu^{241}$ absorbs a neutron in its nucleus and undergoes a nuclear disintegration. This produces on the average, two fission products of lower atomic weight and great kinetic energy, and usually two or three neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electron volts) per fission.

The kinetic energy of the fission products is quickly dissipated in the fuel and other ambient material as heat. If in this fission process there is on the average one neutron remaining after the fission of each fissionable atom which induces a subsequent fission, the fission reaction becomes self-sustaining and the heat generation is continuous. The heat is removed by passing a coolant through heat exchange relationship with the fuel and a load or heat sink. The reaction may be continued as long as sufficient fissionable material remains in the system to override the effects of the fission products which will be produced during operation.

Useful mechanical or electrical energy can be generated by conversion of the heat energy liberated in the foregoing neutron-induced nuclear fission reactions. This energy generation involves a chain reacting assembly containing nuclear fuel, a coolant passed through heat exchange relationship with the assembly, and control of the coolant flow and the assembly operating conditions to produce, either directly or indirectly, a heated coolant. This coolant is fed to a suitable prime mover to generate the mechanical or electrical energy. Reasonably high thermodynamic energy conversion efficiencies are favored by the delivery of the heated coolant from the chain reacting assembly to the prime mover inlet at as high a temperature as possible. With coolant temperatures in the range of from about 500° F. to about 1500° F., high thermodynamic efficiencies are obtained. The use of still higher inlet temperatures to achieve further increases in efficiency is limited primarily by reason of the increased heat losses from the system and the mechanical or chemical properties of the structural materials used in the system.

The materials present in some new nuclear fuels, and the materials present in all nuclear fuels after irradiation, are detrimental to animal or plant life, or both. Release of these materials to the environs in the event of a serious reactor accident must be prevented. The most serious credible reactor accident is in general conceived as a rupture of the reactor pressure vessel, or of a major coolant line connected to the vessel, together with exothermic chemical reactions between the fuel and coolant, moderator, or other materials which may be present. The energy release in such an accident can conceivably be quite high, depending partly upon the amount and maximum temperature of the coolant, and substantial quantities of vapor are formed including gaseous fission products such as the halogens and rear gases.

To prevent the release of such toxic products resulting from such an accident, large pressure vessel have been built in the conventional spherical or cylindrical forms as a containment around the nuclear reactor and at least part of the reactor coolant system. These containment vessels are designed to withstand the pressures which would be expected to be developed due to the release of vapors or gaseous materials in the event the worst credible accident occurred. In the case of a water moderated and cooled nuclear power reactor rated at a gross output of 192 mw.(e) (megawatts electrical) delivering 1000 p.s.i.a. (pounds per square inch absolute) steam directly to a turbine-generator, a typical conventional containment is a steel sphere 190 feet in diameter with walls 1.375 inches thick designed to withstand 29.5 p.s.i.g. (pounds per square inch gauge) internal pressure. This steel containment vessel weighs approximately 3000 tons and the cost of this containment ranges between 5 and 10 percent of the total plant cost. In addition, large tonnages of concrete are employed inside the containment to provide biological shielding and the structural support for the reactor components.

The containment vessel is clearly a desirable safety feature. However, construction of significantly larger containments which would be required in the construction of nuclear power plants of higher output, such as those approaching 500 mw.(e) and higher, present very difficult engineering, design, and construction problems. In addition, these conventional containments are subject to leaks following the occurrence of a reactor accident and with the super-atmospheric pressure inside, any leakage which does occur may still carry dangerous products into the environs. These conventional containments are not adapted to prevent further nuclear reactions from occurring, and they are not adapted to absorb heat liberated by radioactive decay of products present in the fuel. If coolant is lost in the accident, this decay heat may cause a core melt-down and liberation of additional detrimental materials.

It is accordingly an object of the present invention to provide an improved nuclear reactor containment apparatus which overcomes the aforementioned disadvantages, which is reduced in size, and requires substantially reduced amounts of the usual materials with resulting decrease in cost.

A further object is to provide a combined containment, supporting structure, and biological shield for a nuclear reactor and which is capable of containing the great majority of detrimental products liberated in a reactor accident in spite of possible leaks in the reactor containment.

Another object is to provide an improved combined nuclear reactor support, biological shield, and containment structure including means for terminating the nuclear reaction and for absorbing any decay heat which may be liberated after an accident.

An added object is to contain possibly dangerous products liberated in a nuclear accident, without the build-up of any substantial fluid pressures.

Other objects and advantages of the present invention will become apparent to those skilled in the art as the description and illustration thereof proceed.

Briefly, in accordance with one aspect of the present invention, there is provided a sealed inner containment including an inner chamber or dry well in which the nuclear chain reacting assembly or reactor core is supported, a sealed outer containment surrounding and spaced apart from the inner containment and forming therebetween an outer chamber, a body or pool of liquid in the outer chamber extending from a level substantially below to a level substantially above the extremities of the reactor core to provide a combined radiation shield and heat sink, and means for relieving fluids from the inner chamber into the pool in the outer chamber. Means may also be provided to introduce a portion of the liquid from the pool into the inner containment to submerge or flood the reactor core and provide for the dissipation of core decay heat. The liquid may be alkaline to enhance absorption of acidic fission products. The body of liquid may also contain a nuclear reaction poison, which is a material containing a significant number of atoms having a high non-fission neutron absorption or capture cross-section. This poison functions to improve substantially the effectiveness of the body of liquid as a radiation shield in the outer chamber. The poison is used in sufficient concentration to establish subcriticality and prevent the existence of a self-sustaining nuclear chain reaction upon being introduced into the inner chamber to flood the core. The body of liquid in the outer chamber may be provided further with a plurality of baffles which are closed on their upper and lateral surfaces and which open downwardly to form gas traps in which non-condensible gases or vapors are retained and prevented from reaching and escaping from the upper level of the body of liquid. In this fashion, any liberated fluids normally escaping directly into the reactor containment are in the present invention condensed or otherwise trapped below the surface of a body of liquid so that the pressure existing in the containment after a reactor accident is the same as or only slightly higher than that normally existing prior to such an accident. The disadvantages resulting from possible leaks in or rupture of the conventional containment due to pressure increases are substantially completely eliminated in the improved apparatus of this invention.

The present invention will be more readily understood by reference to the accompanying drawings in which:

FIGURE 1 is a cross-section elevation view of one embodiment of the present invention;

FIGURES 2 and 3 are transverse cross-section views of the apparatus shown in FIGURE 1;

FIGURE 4 is an elevation view of the lower part of the curtain wall shown in FIGURE 1;

FIGURES 5 and 6 are plan and elevation views of a modification of the baffles employed in the body of liquid maintained in the containment apparatus of this invention;

FIGURES 7 and 8 are elevation cross-section views of two additional embodiments of the present invention;

FIGURE 9 is a fragmentary view in partial cross-section of another modification of the baffles employed in the body of liquid maintained in the containment apparatus of this invention; and FIGURE 10 is a transverse cross-section view of the apparatus shown in FIGURE 8 showing the relief means for fluids opening into the liquid body.

Referring now more particularly to FIGURE 1, reactor vessel 10 is provided with hemispherical head 12 and supporting means 14. The reactor core 16 is contained within the pressure vessel. Reactor coolant lines 18 and 20 open into the bottom of vessel 10. Reactor coolant outlet 22 opens from vessel head 12 and passes through tunnel 24 through the walls of the containment apparatus of this invention for delivery to an appropriate load. Control elements such as 26 open from control element drives 28 into core 16 to control the nuclear reaction and the power level of the reactor.

The apparatus of this invention includes inner containment and biological shield 30 by means of which reactor vessel 10 is supported through means 14 in inner chamber or dry well 32. Outer containment 34 surrounds inner containment 30 forming chamber 36 therebetween which is filled from its lower level 38 with a body or pool of liquid 40 having an upper level 42. Outer containment 34 is closed and sealed at its upper end by a suitable pressure resistant closure, such as a hemispherical or elliptical steel head 44, the lower part only of which is shown in this figure. Pool 40 extends more or less annularly around inner containment 30 from a point substantially below the lower end of core 16 to a level substantially above the upper end of the core. One or more tunnels 24 open through pool 40. Through such a tunnel passes coolant outlet line 22. This orientation is more clearly shown in FIGURE 2 subsequently described. The pool 40 thus augments the shielding effect of the concrete or other material used as inner containment 30.

Dry well 32 is provided at its upper end with a closure including a lower element 50, upper element 52, one or more shear plates 54, and closure seal 56. Dry well 32 is thus sealed and is designed to be capable of resisting moderate internal pressures. Normal pressure present in dry well 32 is maintained at or about atmospheric pressure.

Opening outwardly through the wall of inner containment 30 from the intermediate region of dry well 32 at a point adjacent reactor vessel 10 is a plurality of vent tubes 60 provided with rupture discs 62 at their outlet ends. These discs are designed to rupture at a pre-determined pressure substantially below that for which inner chamber 32 is designed. These discs may be located, if desired, at the inlet end of vent tubes 60. An annular air pocket 64 opening downwardly into pool 40 is disposed in fluid receiving relation to vent tubes 60. The pocket is formed by an inverted L-shaped baffle made up of horizontal section 66 and vertical section 68. Cylindrical section 68 forms the lower extension of a curtain wall 70 extending downwardly from upper horizontal section 72. Between this wall and inner containment 30 are formed various equipment spaces 73 and 74. The lower extension 68 of the curtain wall may be provided with a notched or otherwise serrated lower edge 76 in order to break up and disperse gas bubbles into pool 40. This facilitates the condensation of the condensible fraction of the escaping fluids. A plurality of downwardly opening baffles 78 which are concave upwardly is provided throughout at least part of pool 40. These function to increase the contact between the pool liquid and the gas phase and to accumulate the non-condensible fraction of the gases as they rise through pool 40 and enter the lower openings of baffles 78. This prevents these gases from reaching liquid surface 42, and after they form they serve to cushion shock waves generated in the pool by condensation of the condensible fraction.

In operation, the dry well 32 receives the initial discharge of escaping fluids from the reactor vessel 10. The pressure rises to that at which the rupture discs give away, the condensible and non-condensible vapors escape through vent tubes 60 into air pocket 64 which minimizes the initial shock wave and subsequent water hammer effects. The liberated vapors discharge downwardly into pool 40 and pass under the lower rim 76 of curtain wall extension 68. The vapors rise through pool 40 in outer chamber 36 toward liquid level 42. The condensible vapors are rapidly condensed in the cool liquid, the non-condensible but soluble constituents are dissolved in the liquid, the non-condensible constituents are rapidly cooled forming small bubbles which rise through pool 40 to be trapped as gas pockets 80 shown in the upper part of downwardly opening baffles 78, and any particulate solid matter released is cooled and retained by pool 40 in which it settles gradually to bottom 38. Substantially complete retention of all gases, vapors, liquid, and solid material released from inner chamber 32 through vent tubes 60 is achieved in pool 40. This retention in pool 40 is responsible for the absence of any substantial pressure increase in the air space 46 which exists above liquid level 42 in the upper closure 44 of the outer containment. Accordingly, this closure can be designed to withstand pressures of from about 2 to about 5 p.s.i.g., rather than the 30 to 50 p.s.i.g. which would otherwise be required in the case of a conventional containment which necessarily would be larger.

In order to insure that reactor core 16 will not melt down in the event of a coolant loss through the rupture of the vessel or coolant line, lines 90 and remotely actuated valves 92 are provided which open the lower end of pool 40 into coolant inlet lines 18 and 20. Also, each coolant outlet line 22 is provided with line 94 and remotely actuated valve 96 which serve to communicate each outlet line 22 with the upper part of pool 40. As soon as the expansion forces have dissipated, the hydrostatic forces existing in pool 40 cause a flow of liquid from the pool through lines 90 and the coolant inlet lines upwardly into and through reactor vessel 10 and outwardly through lines 22 and 94 back into the pool. The decay heat liberated from core 16 generates natural convection currents through the core to and from the pool to dissipate heat liberated.

Pool 40, both during normal operation of the reactor as well as after an accident which discharges vapor for condensation into the pool, requires external cooling. In normal operation, some heat is generated due to the absorption of reactor radiation, as well as decay heat liberated from irradiated fuel elements 112 which may be stored in pool 40. Accordingly, pool cooling exchanger 100 is provided with inlet and outlet 102 and 104 through which is circulated any suitable coolant, such as industrial cooling water from an evaporative cooler.

An added feature of the present invention consists in the composition of the pool 40. In a preferred embodiment of this invention, the pool is water made slightly alkaline, to a pH of between about 7 and about 10, by the addition of soluble alkaline materials such as the ammonium or alkali metal hydroxides, bicarbonates, carbonates, and the like. The alkalinity insures the rapid dissolution of acidic non-condensible fission products, such as the radioactive halogens. The addition of sufficient boron as a soluble salt to provide about 500 parts per million of boron in the pool, is sufficient to make and maintain the reactor core subcritical and thus prevent completely any resumption of nuclear reaction in the core after core flooding as previously described. Further, the presence of boron salts in the pool has been found to increase substantially the effectiveness of this material as a radiation shield. One desirable way of doing both is to dissolve boric acid in the pool water to the required extent followed by caustic soda for example, to the desired pH.

Following the rupture of disc 62 it may in some instances be desirable to flood dry well 32 as well. This flooding is ultimately and partially effected by pressure reduction, due to vapor condensation in gas pocket 64 and in dry well 32, which draws liquid from pool 40 inwardly through vent pipes 60 into the dry well. Line 106 provided with remotely actuated valve 108 is provided opening from the upper part of dry well 32 into the upper portion of pool 40. This vents non-condensible gases from dry well 32 or introduces liquid from the upper portion of pool 40 directly into the dry well and facilitates immediate dry well flooding. The volume of liquid in pool 40 standing above the upper part of reactor vessel 10 is made sufficient so that level 42 will not drop below pool cooler 100 when the dry well and core 16 are both flooded to a level above the upper end of reactor vessel 10.

Pressure relief valves are customarily provided opening from pressure vessel 10 or from outlet line 22, or both. In this case, they are shown opening from outlet line simply as lines 110. They discharge through the walls of tunnel 24 into pool 40 as is more clearly shown in FIGURE 2.

In FIGURE 2 reactor vessel 10 is shown with coolant outlet line 22 opening from vessel head 12 outwardly through inner containment 30, through tunnel 24 and pool 40, and through outer containment 34 to the load not shown. The relief lines 110 provided with relief valves 112 opening into pool 40 are shown. Further, line 94 and valve 96 connecting outlet line 22 with pool 40 for emergency cooling of the reactor core are also shown.

In FIGURE 3, a partial section view of a lower level of the structure shown in FIGURE 1 appears. Reactor core 16 supported by pressure vessel 10 is shown within dry well 32. The plurality of vent tubes 60 is shown opening radially outwardly from dry well 32 through inner containment 30 into gas pockets 64. Radial structural members 116 are provided connecting inner containment 30 with curtain wall 70. At this elevation pool 40 extends between curtain wall 70 and outer containment 34. Baffles 78 are not shown for reasons of clarity of illustration.

In FIGURE 4 an elevation view of the lower rim 76 of curtain wall extension 68 is shown illustrating the irregular notched edge provided to insure distribution of escaping fluids into relatively small bubbles.

In FIGURES 5 and 6 are plan and elevation views respectively of one form of baffle which may be employed in the apparatus of this invention. In FIGURE 5 is shown part of an inner containment 30 and outer containment 34 enclosing pool 40. Disposed vertically in the pool are vertical inner and outer support means 120 and 122 and transverse support means 124 and 126. Baffle elements 128 are secured to means 124 and 126 and are provided with open-ended tubes 140 through which the gases and vapors may pass to provide improved vapor-liquid contact.

In FIGURE 6 a detailed cross-section view of the baffle element 128 is shown consisting of an upper plate element 130 and a lower channeled element 132 providing a plurality of downwardly opening channels 134 in which non-condensible gases may accumulate above the lower open ends of tubes 140. The lateral edges of upper plate element 130 are provided with interlocking connecting means 136 and 138 so that they may be joined together.

*Example 1*

For a nuclear power reactor power plant rated at 200 mw.(e), the reactor core contains 89 fuel assemblies each consisting of a 12 by 12 array of 0.568 inch outside diameter zirconium-clad fuel rods spaced 0.79 inch center to center. The fuel assemblies are 9.712 inches on a side, 12.9 feet long, and are grouped together to form a more or less circular core having a 9.9 feet diameter circumscribed circle. The volumetric ratio of water to uranium dioxide fuel is 2.1, the fuel contains 1.5 percent $U^{235}O_2$, and there is a total of 57.7 tons of uranium dioxide fuel in the reactor. The thermal rating of the core is 658 mw.(t) (thermal megawatts). Cooling water enters the core at 527° F. and is partially vaporized to produce 1000 p.s.i.g. steam at about 545° F. The coolant rate totals 36.1 million pounds of water per hour, the core discharging 2.3 million pounds of steam per hour which is delivered to a 200,000 kw. steam turbine at 965 p.s.i.a. inlet pressure.

The reactor vessel is designed for 1250 p.s.i.g., and is 12.5 feet inside diameter, 41.8 feet inside height, and has a wall thickness of 5.50 inches including a 0.25 inch thick internal cladding of type 304 stainless steel.

The improved reactor support, shield, and containment embodying this invention for this particular reactor includes an inner chamber 15 feet inside diameter, 33 feet outside diameter, an outer containment about 2 feet thick and 70 feet in diameter, the outer containment being capped with a hemispherical steel dome 70 feet in diameter and designed for an internal pressure of 5 p.s.i.g. The total structure is 112 feet high. The pool has a total depth of 54 feet and contains about 114,000 cubic feet of water. Sodium pentaborate is dissolved in this water in an amount corresponding to 500 p.p.m. (parts per million) of natural boron and the pH is maintained at about 9.5. The worst credible accident discussed above does not raise the pressure existing in the hemispherical steel dome above the pool more than about 2 p.s.i.g. There are required 13,800 tons of ordinary concrete and 254 tons of steel in this structure, compared to the 58,200 tons of concrete and 3154 tons of steel for the conventional reactor support, shield, and containment for this size plant. In addition, the combined shielding, emergency condenser and core cooling and flooding features described are obtained.

In FIGURE 7 is shown another embodiment of this invention applied to a nuclear reactor. The containment in this embodiment includes inner containment and reactor support and shield 150 provided with upper closure means 152 and containing inner chamber or dry well 154, outer containment 156 consisting of a spherical steel vessel having a lower closure 158 and an upper closure 160. Outer chamber 162 is formed between the inner and outer containments and pool 164 is maintained in outer chamber 162 having liquid level 166. A seal 167 is maintained between containments 150 and 156.

Reactor vessel 168 is supported in dry well 154 by conventional means shown and contains reactor core 170. Thermal shield 172 provided with cooling means 174 is disposed in inner containment 150 immediately opposite core 170 to attenuate gamma radiation and dissipate gamma ray heat. Support means 176 is provided for inner and outer containments 150 and 156 resting on a suitable foundation 178.

In FIGURE 7 the means for passing coolant through reactor vessel 168 and the means for controlling the reactor are not shown to simplify illustration of this embodiment of the invention. Such equipment items are, however, illustrated in FIGURE 1 and are in general known to those skilled in the art.

A plurality of vent tubes 180 open radially through inner containment 150 from the upper end of dry well 154 and turn downwardly penetrating liquid level 176 to lower open end 182. It has been found that the depth of submergence of the outlets of vent tubes 180 below liquid level 166 need not be more than about 1 foot. Due allowance must be made for the drop in liquid level 166 due to the back flooding of the dry well 154 and the reactor vessel 188 as previously described. Pressure control manifold 184 is provided which communicates by means of individual lines 186 with each of the vent tubes 180 and maintains dry well 154 and the vent tubes at sufficient pressure to depress the liquid level 188 in the vent tubes to a point just above the lower open ends 182 as indicated. This pressure control is maintained by means of differential pressure controller 199 which actuates valve 192 in line 194 which communicates with manifold 184.

In the event of the worst credible accident, the pressure, due to released fluids, rises in dry well 154. This increase in pressure immediately depresses liquid level 188 in vent tubes 180 and the vapors discharge downwardly into pool 164 immediately outside containment 150. Transient pressure effects in dry well 154 are substantially reduced due to the absence of any substantial amount of liquid in the vent tubes. The condensible vapors are condensed rapidly in pool 164, the liquid is set rapidly in motion in the direction indicated by the arrows, extremely efficient mixing of the contents of the pool is effected, and this agitation maintains the pool at a substantially uniform temperature for highly effective condensation. Particulate matter is retained in the pool, and non-condensible fluids ultimately accumulate in vapor space 196 above liquid level 166. Baffles may be provided in pool 164 if desired for purposes described above.

Means may be provided in the apparatus shown in FIGURE 7 to back flood dry well 154 as well as core 170 in pressure vessel 186 by means described previously in FIGURE 1. Sufficient volume of pool liquid is provided to maintain level 166 above the top of reactor vessel 168 at all times.

*Example II*

As a specific example of a nuclear reactor provided with the embodiment of this invention as illustrated in FIGURE 7, the following data are given:

For a nuclear reactor rated at 12.5 mw.(e) the reactor core contains 60 fuel assemblies 79.25 inches long and 4.66 inches on a side, each containing a 6 by 6 array of 36 zirconium clad fuel rods each 0.56 inch in diameter and spaced 0.776 inch center to center. The fuel is enriched uranium dioxide containing 2.5 percent $U^{235}O_2$. The core fits into a circumscribed circle 52.3 inches in diameter and contains a total of 8870 pounds of uranium dioxide fuel. The reactor vessel is 78 inches inside diameter, 28.5 feet inside height, has a wall thickness of 3.00 inches including a 0.25 inch thick internal cladding of type 304 stainless steel. The operating pressure is 875 p.s.i.a. and the design pressure is 1100 p.s.i.a.

The rating of the core is 46.2 mw.(t) with water coolant introduced at 519° F. and discharging partially vaporized at 531° F. The coolant flow rate is 3.43 million pounds per hour including 0.162 million pounds per hour of steam delivered at 850 p.s.i.g. to a turbine-generator rated at 12,500 kw.

The outer containment embodying the present invention consists of a steel sphere 45 feet in diameter designed for a 25 p.s.i.g. internal pressure. The concrete inner containment provides a dry well 8 feet inside diameter, and is 16 feet outside diameter extending to a height of 44 feet inside the steel sphere. The annular outer chamber contains 240,000 gallons of water into which sixteen 8 inch schedule 40 vent tubes open from the top of the dry well. The temperature rise of the pool in case of the worst credible accident does not exceed 10° F. and the pressure rise in the free space above the liquid level in the outer chamber does not exceed 5 p.s.i.g.

This structure utilizes 2020 tons of ordinary concrete and 250 tons of steel, and is to be compared with the conventional shield support and containment structure for a 12.5 mw.(e) reactor which utilizes 7800 tons of concrete and about 684 tons of steel.

Referring now to FIGURE 8, another embodiment of the present invention is shown. Reactor vessel 200 containing reactor core 202 is supported by the means shown within dry well 204. Coolant inlet 206 and coolant outlet 208 are provided to provide for passage of the working or coolant fluid through the core. Dry well 204 is provided with lower shield closure 210 and upper closure 212. The improved reactor support, shield, and containment of this invention consists of inner containment 214, outer containment 216, and pool 218 having upper liquid level 220 in the outer chamber between the two containments. The outer containment is completed by means of an upper hemispherical steel dome 222 designed for an internal pressure of about 5 p.s.i.g. Opening outwardly from the lower part of dry well 204 is a plurality of vent tubes 224 provided at their inner ends with rupture discs 226. Pressure manifold 228 is provided communicating with each vent tube 224 and by means of which the vent tubes are kept substantially free of pool liquid in the manner described previously in connection with FIGURE 7.

The outer chamber 230 is provided with at least one helicoid baffle means extending laterally between inner containment 214 and outer containment 216 in the pool 218. In FIGURE 8 two such helicoids 232 and 234 are shown. They begin in pool 218 at a level somewhat above the vent tubes 224 and extend vertically along helical paths to a level adjacent the upper end of the pool. This provides an elongated path through pool 218 for fluids discharging from vent tubes 224. The structural details of these helicoids and the lateral baffles employed therewith to provide for trapping non-condensible gases are more clearly shown in FIGURE 9.

Emergency cooling of reactor vessel 200 is provided in the form of exchanger 236 submerged in pool 218.

This indirect heat exchanger is provided with outlet and inlet manifolds 238 and 240 respectively. Outlet manifold 238 opens through line 242 into coolant outlet line 208 at the top of reactor vessel 200, and is provided with remotely actuated control valve 244. Inlet manifold 240 is connected by means of line 246 provided with remotely actuated valve 248 with coolant inlet line 206. In the event of an accident, valves 244 and 248 are opened and natural convection circulation of reactor coolant is set up through vessel 200 and emergency cooler 236 whereby pool 218 is used as a heat sink.

Backflooding of dry well 204 and reactor vessel 200 is provided by lower vent tubes 224 acting in conjunction with upper vent tubes 250 which open from the upper position of inner dry well 204 into pool 218.

In FIGURE 9 a partial elevation view showing the outer surface of inner containment 214, and a cross-section of outer containment 216 appear. In outer chamber 230 is shown a helicoid baffle 252 extending through the pool as previously described. Extending downwardly from the lower surface of helicoid 252 is a plurality of projections 254 which are attached to the sloping undersurface of helicoid 252 and extend between the outer and inner surfaces of inner and outer containments 214 and 216 respectively to provide downwardly opening gas traps for the accumulation of non-condensible gases and prevent their reaching liquid level 220 indicated in FIGURE 8.

In FIGURE 10 is shown a transverse section of inner containment 214 taken at the level indicated in FIGURE 8. Dry well 204 appears at the center and pool 218 surrounds inner containment 214. Lower vent tubes 224 open outwardly into pool 218 and are provided at their inner ends with rupture discs 226.

The above-described drawings illustrate three representative embodiments of the present invention, specifically those of FIGURES 1, 7, and 8. It should be understood that the various mechanical modifications described in conjunction with each are intended to be used interchangeably. For example, the tunnel means shown in FIGURES 1 and 2 for passing the reactor coolant outlet through the pool is intended to be used in the embodiments shown in FIGURES 7 and 8. The emergency cooling of the reactor core by direct heat exchange with the pool liquid as shown in FIGURE 1 and by indirect heat exchange as shown in FIGURE 8 can be interchanged, and either can be used in the embodiment of FIGURE 7. Similarly the various vent tubes and baffle designs and means for dry well flooding described are interchangeable.

The present invention effectively provides the desirable radiation shield, reactor support and containment, and heat sink features described in a compact structure requiring only about 25 percent as much concrete and steel as the conventional structure. The various modifications of the apparatus of the present invention herein described provide for the simultaneous support and radiation shielding of a nuclear reactor, the cooling and partial condensation of fluids released from the reactor in the case of an accident, the accumulation and retention of non-condensible as well as particulate solid materials which may be released in such an accident, the direct cooling of the reactor core to prevent decay heat from further damaging the fuel, and the poisoning of the reactor core by means of nuclear reaction poisons contained in the pool liquid. Indeed the pool may be employed to store irradiated fuel which is removed periodically from most nuclear reactors.

The inner and outer containments can be either steel or concrete or both. The inner containment is preferably concrete and either the ordinary or special high-density kinds are applicable. The steel used is preferably mild or low alloy steel.

The pool liquid is preferably ordinary water, although other liquids or mixtures of other liquids can be substituted such as the various mono and polyhydric materials including alcohols, glycols and glycerols to overcome freezing and other problems.

Nuclear reaction poisons which are suitable for use in this invention include the various known compounds of boron, cadmium, gadolinium, silver, dysprosium, samarium, europium, hafnium, mercury, and other elements having high non-fission neutron capture cross-sections, which compounds are soluble in the pool liquid employed. Although the present invention is particularly well adapted to use with a nuclear reactor, it is also applicable in the emergency containment of other apparatus containing material of high potential energy release, such as chemical processing reactors, and the like.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. A combined nuclear reactor vessel support, radiation shield, and containment which comprises a sealed inner containment providing therein a dry well in which the reactor vessel containing a fluid is supported, a sealed outer containment surrounding and spaced apart from said inner containment, a pool of liquid disposed between said inner and outer containments and surrounding said dry well, and conduit means for relieving fluids released from said vessel into said dry well opening from said dry well through said inner containment directly into said pool.

2. An apparatus for the combined structural support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of liquid disposed within said outer chamber and surrounding said dry well and extending from a level substantially below to a lever substantially above the extremities of said reactor core, and normally sealed conduit means for relieving fluids released into said dry well from said vessel opening from said dry well through said inner containment directly into said pool.

3. An apparatus for the combined structural support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of liquid disposed within said outer chamber and surrounding said dry well and extending from a level substantially below to a level substantially above the extremities of said reactor core, normally sealed conduit means for relieving fluids released into said dry well from said vessel opening from said dry well through said inner containment directly into said pool, and normally sealed means for bringing said pool liquid into heat exchange relation with said reactor core.

4. An apparatus for the combined structural support, radiation shielding, and containment of a nuclear reactor vessel which comprises a sealed inner containment providing therein a dry well in which said nuclear reactor vessel containing a fluid and a reactor core is supported, sealed outer containment surrounding and spaced apart from said inner containment and forming an outer chamber therebetween, a pool of liquid disposed within said outer chamber and surrounding said dry well and extending from a level substantially below to a level substantially above the extremities of said reactor core, normally sealed conduct means for relieving fluids released into said dry well from said vessel opening from said dry well through said inner containment directly into said pool, and at least one valved opening between said nuclear reactor vessel and said pool for passing said pool liquid into direct heat exchange relation with said reactor core.

5. An apparatus for the combined structural support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of liquid disposed within said outer chamber and surrounding said dry well and extending from a level substantially below to a level substantially above the extremities of said reactor core, normally sealed conduit means for relieving fluids released into said dry well from said vessel opening from said dry well through said inner containment directly into said pool, and heat exchange means submerged in said pool and communicating through normally closed valved conduits with said nuclear reactor vessel for bringing said pool liquid into indirect heat exchange relation with said reactor core.

6. An apparatus for the combined structural support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of liquid disposed within said outer chamber and surrounding said dry well and extending from a level substantially below to a level substantially above the extremities of said reactor core, normally sealed conduit means for relieving fluids released into said dry well from said vessel opening from said dry well through said inner containment directly into said pool, said pool containing a nuclear reaction poison in sufficient concentration to make and hold said reactor core subcritical upon introduction of liquid from said pool into said core.

7. An apparatus for the combined structure support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of alkaline liquid disposed within said outer chamber and surrounding said dry well and extending from a level substantially below to a level substantially above the extremities of said reactor core, and normally sealed conduit means for relieving fluids released into said dry well from said vessel opening from said dry well through said inner containment directly into said pool.

8. An apparatus for the combined structural support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of liquid disposed within said outer chamber and surrounding said dry well and extending from a level substantially below to a level substantially above the extremities of said reactor core, normally sealed conduit means for relieving fluids released into said dry well from said vessel opening from said dry well through said inner containment directly into said pool, and a plurality of downwardly opening baffles which are concave upwardly submerged in said pool.

9. An apparatus for the combined structural support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of liquid disposed within said outer chamber and surrounding said dry well and extending from a level substantially below to a level substantially above the extremities of said reactor core, normally sealed conduit means for relieving fluids released into said dry well from said vessel opening from said dry well through said inner containment directly into said pool, and means for cooling said pool to dissipate heat therefrom.

10. An apparatus for the combined structural support, radiation shielding, and containment of a nuclear reactor vessel which comprises a sealed inner containment providing therein a dry well in which said nuclear reactor vessel containing a fluid and a reactor core is supported, a sealed outer containment surrounding and spaced apart from said inner containment and forming an outer chamber therebetween, a pool of liquid disposed within said outer chamber and surrounding said dry well and extending from a level substantially below to a level substantially above the extremities of said reactor core, and at least one normally sealed vent tube opening from said dry well through said inner containment directly into said pool and which opens upon increase of pressure in said dry well to conduct fluids released from said reactor vessel into said dry well directly into said pool.

11. A combined nuclear reactor support, radiation shield, and containment which comprises a cylindrical inner containment providing dry well closed at its lower end and adapted to receive and support a reactor vessel containing a nuclear reactor core and a fluid, coolant conduits opening into and from said vessel, sealable closure means at the upper end of said dry well, a cylindrical outer containment spaced apart from and surrounding the inner containment forming an annular outer chamber therebetween, pressure resistant sealed closure means at the upper end of said outer containment to seal said outer chamber, a pool of water maintained in said outer chamber and extending from a level substantially below to a level substantially above the reactor core, a plurality of normally sealed vent tubes opening outwardly through said inner containment into said outer chamber and adapted to discharge fluids released from said vessel under pressure from said dry well into said pool, and valved conduits opening from said coolant conduits into said pool in said outer chamber and adapted to flood said core with water from said pool.

12. An apparatus according to claim 11 in combination with baffle means extending outwardly and downwardly from the outer surface of said inner containment and providing thereunder an air pocket in said pool and into which said vent tubes discharge.

13. An apparatus according to claim 12 wherein said baffle means has an inverted L-shaped cross-section and is provided with a lower serrated edge.

14. An apparatus according to claim 11 in combination with at least one closed tunnel means opening outwardly from said inner containment through said body of water and through which extends the coolant conduit opening from said reactor vessel, and at least one conduit having a pressure relief valve opening from said coolant conduit in said tunnel through the wall of said tunnel into said pool.

15. An apparatus according to claim 11 in combination with downwardly opening baffle means which are concave upwardly and are disposed in said pool.

16. An apparatus according to claim 11 in combination with at least one helicoid baffle means extending laterally between the inner and outer containments in said pool and extending vertically from a level above the vent tubes to a level adjacent the upper end of said pool, said helicoid being provided on its lower surface with a plurality of downward projections which extend from the outer surface of said inner containment to the inner surface of said outer containment to provide a plurality of downwardly opening gas traps to accumulate any noncondensible fraction of gases released through said vent tubes.

17. An apparatus according to claim 11 wherein said pool contains a soluble nuclear reaction poison therein to make and maintain the reactor core subcritical and prevent resumption of a nuclear reaction therein upon introduction into said core.

18. A combined nuclear reactor support, radiation shield, and containment which comprises a cylindrical inner containment providing dry well closed at its lower end and adapted to receive and support a reactor vessel containing a nuclear reactor core and fluid coolant conduits opening into and from said vessel, sealable closure means at the upper end of said dry well, a spherical outer containment spaced apart from and surrounding said inner containment and forming therebetween an annular outer chamber, a pool of water disposed in said outer chamber and extending from a level substantially below to a level substantially above the reactor core, and a plurality of normally sealed vent tubes opening outwardly from the upper end of said dry well through said inner containment and ending in said pool at a point adjacent the upper surface thereof, and adapted to discharge fluids released from said vessel under pressure from said dry well into said pool.

19. An apparatus according to claim 18 wherein said vent tubes open radially through said inner containment and then downwardly through to a point below the upper level of said pool, in combination with pressure control means for maintaining the liquid level in said vent tubes at a point adjacent the lower open end thereof to minimize transient pressure effects.

References Cited in the file of this patent

UNITED STATES PATENTS

| | | |
|---|---|---|
| 2,743,225 | Ohlinger et al. | Apr. 24, 1956 |
| 2,810,689 | Wigner et al. | Oct. 22, 1957 |
| 2,816,068 | Ruano | Dec. 10, 1957 |
| 2,841,545 | Zinn | July 1, 1958 |
| 2,861,033 | Treshow | Nov. 18, 1958 |
| 2,937,127 | Flora et al. | May 17, 1960 |
| 3,022,238 | Kolflat | Feb. 20, 1962 |

OTHER REFERENCES

"Power," September 1955, pp. 75–81.

APAE–30, "Army Power Package Reactor APPR–1 Operating Manual and Inspection and Service Manual," February 1958, pp. 198–200.

Kolflat et al.: "A New Approach to the Design of Containment Shells for Atomic Power Plants." Text prepared for presentation at 19th Annual American Power Conference, Mar. 27–29, 1957.